(12) United States Patent
Abe (10) Patent No.: US 6,670,983 B2
(45) Date of Patent: Dec. 30, 2003

(54) ELECTRIC MASK GENERATING APPARATUS OF ELECTRONIC ENDOSCOPE (75) Inventor: Kazunori Abe, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 522 days.

(21) Appl. No.: 09/775,616

(22) Filed: Feb. 5, 2001

(65) Prior Publication Data

US 2001/0052929 A1 Dec. 20, 2001

(30) Foreign Application Priority Data

Feb. 7, 2000 (JP) .......................................... 2000-029839
Feb. 7, 2000 (JP) .......................................... 2000-029840

(51) Int. Cl.[7] .............................. A61B 1/05; H04N 7/18
(52) U.S. Cl. ......................... 348/65; 348/74; 348/596; 600/109; 600/173
(58) Field of Search ........................... 348/65, 74, 596; 600/109, 173

(56) References Cited

U.S. PATENT DOCUMENTS 5,347,987 A  *  9/1994  Feldstein et al. ........... 600/109

* cited by examiner

Primary Examiner—Howard Britton
(74) Attorney, Agent, or Firm—Snider & Associates; Ronald R. Snider (57) ABSTRACT This electric mask generating apparatus reads mask bit string generation data, which has a configuration of one pixel per bit and is set in ROM, by a microcomputer, develops the mask bit string generation data in RAM, and thereafter writes the mask bit string generation data in mask generation memory. This electric mask generating apparatus reads a mask signal in this mask generation memory by a microcomputer, and mixes an image signal of an object with the above-described mask signal by using a shift register or the like in a mask-mixing circuit. According to the mask signal having this configuration of one pixel per bit, since it is possible to write the mask signal in the above-described mask generation memory during the time that is one-eighth of conventional write time, it becomes possible to quickly display an image to which a normal mask or a scaled mask is given.

7 Claims, 9 Drawing Sheets

ELECTRIC MASK GENERATING APPARATUS OF ELECTRONIC ENDOSCOPE

This application claims the priority of Japanese Patent Application No. 2000-29839 filed Feb. 7, 2000, and Japanese Patent Application No. 2000-29840 filed Feb. 7, 2000.

BACKGROUND OF THE INVENTION

1. Field of the Invention

The present invention relates to an electric mask generating apparatus of an electronic endoscope, in particular, to mask generation processing for forming an image signal, to which a mask is attached by using mask generation memory, in short time.

2. Description of the Prior Art

An electronic endoscopic apparatus images an object with an image pickup device that is located in an end part of a scope (an electronic endoscope) such as a CCD (Charge Coupled Device), and performs predetermined image processing of a video signal obtained by this CCD. Owing to this, the object image is displayed on a monitor. On this monitor screen, an electric mask is given to a perimeter of the screen, and the above-described object image is displayed on, for example, a circular opening section set in this electric mask.

Figure 9:
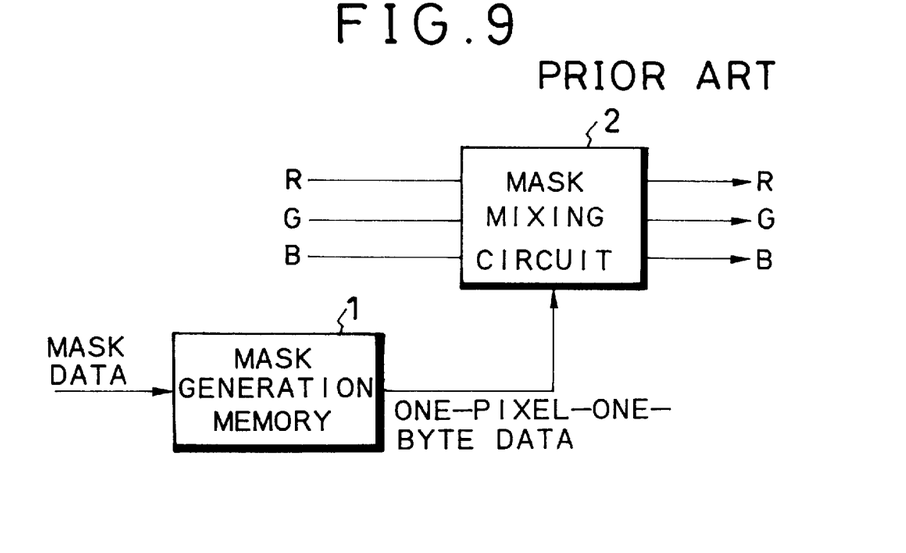
FIG. 9 is a block diagram showing a partial circuit in conventional electric mask generation.

In FIG. 9, a circuit of an electric mask-generating section of an electronic endoscope is shown. In this mask-generating section, a mask signal having a predetermined mask shape is written in a mask generation memory 1, and this mask signal is mixed in a video signal of the object in a mask-mixing circuit 2. For example, the video signal inputted into this mask-mixing circuit 2 is made to be R (red), G (green), and B (blue) signals formed from outputs of the above-described CCD, and the mask signal is mixed and given to these R, G, and B signals.

FIGS. 10(A) to 10(D) show mixing processing of the above-described electric mask signal. FIG. 10(A) shows an original image that is an image before masking and is inputted into the above-described mask-mixing circuit 2, and this becomes an image that an object image F is displayed with a body tube frame 3 on a screen 4. In this image, not only small irregularity portions of the body tube frame 3 are displayed, but also a vignetting portion in its perimeter occurs. On the other hand, as shown in FIG. 10(B), by a mask (image) $M_1$, which covers the perimeter of the image and has a circular opening section, being formed on the basis of the mask signal in the above-described mask generation memory 1, and by the signals in FIG. 10(A) and FIG. 10(B) being mixed in the above-described mask-mixing circuit 2, as shown in FIG. 10(C), a screen 4 that is easy to be watched and in which the body tube frame 3 and the vignetting portion are covered is formed.

BRIEF SUMMARY OF THE INVENTION

Object of the Invention

Figure 5A:
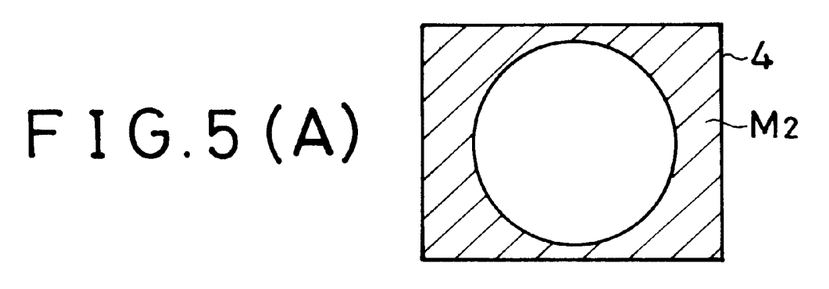
FIGS. 5(A) to 5(D) are schematic diagrams showing operation at the time of mask switching in the second embodiment.
Figure 5B:
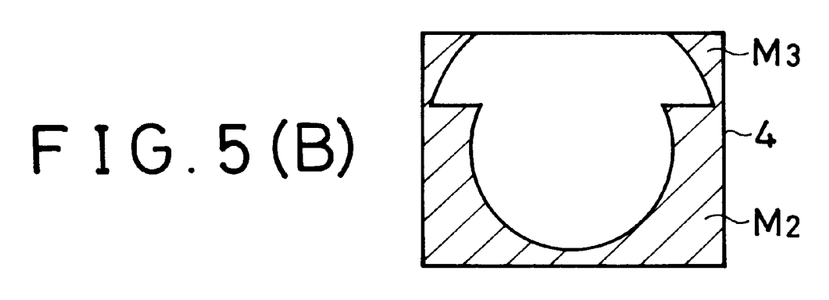
Figure 5C:
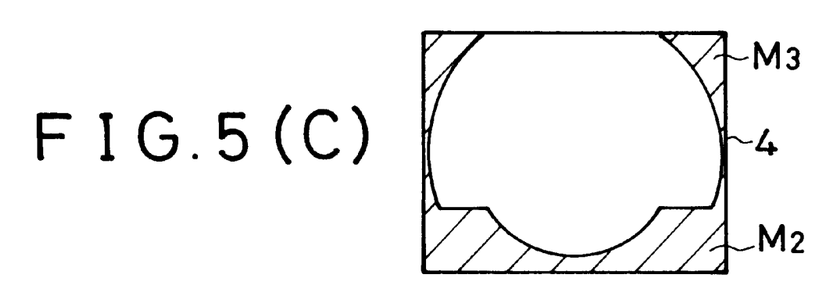
Figure 5D:
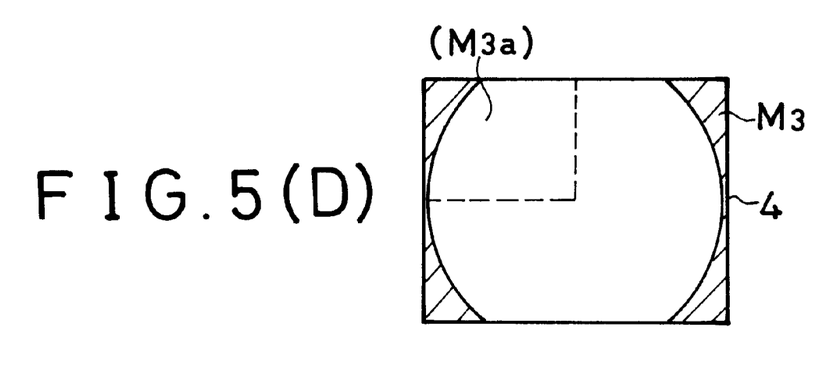
Figure 7:
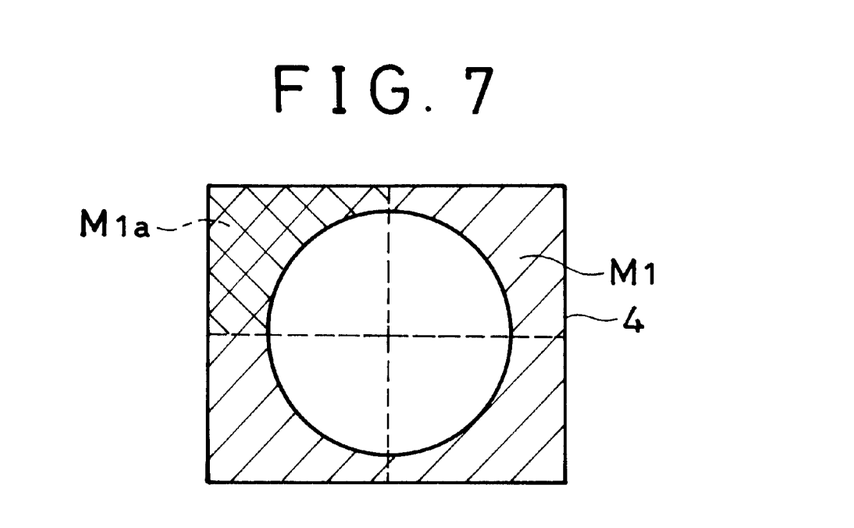
FIG. 7 is a schematic diagram for explaining a case of dividing an electric mask division into four.

However, the above-described electric mask generation processing has a problem that about 9.7 frames (more than one second in time) are required in mask generation. The present applicant proposes forming one piece of mask image by, for example, storing quarter data $M_{1a}$, which is a quarter of the mask $M_1$ as shown by dotted lines shown in FIG. 7, in the mask generation memory 1 shown in FIG. 9, and reading this mask data $M_{1a}$ four times sequentially by changing a read direction. Nevertheless, conventionally, as shown in FIG. 5(D) showing a part of the mask enlarged, one pixel P of the mask image $M_1$ is expressed in one byte of data.

Figure 8:
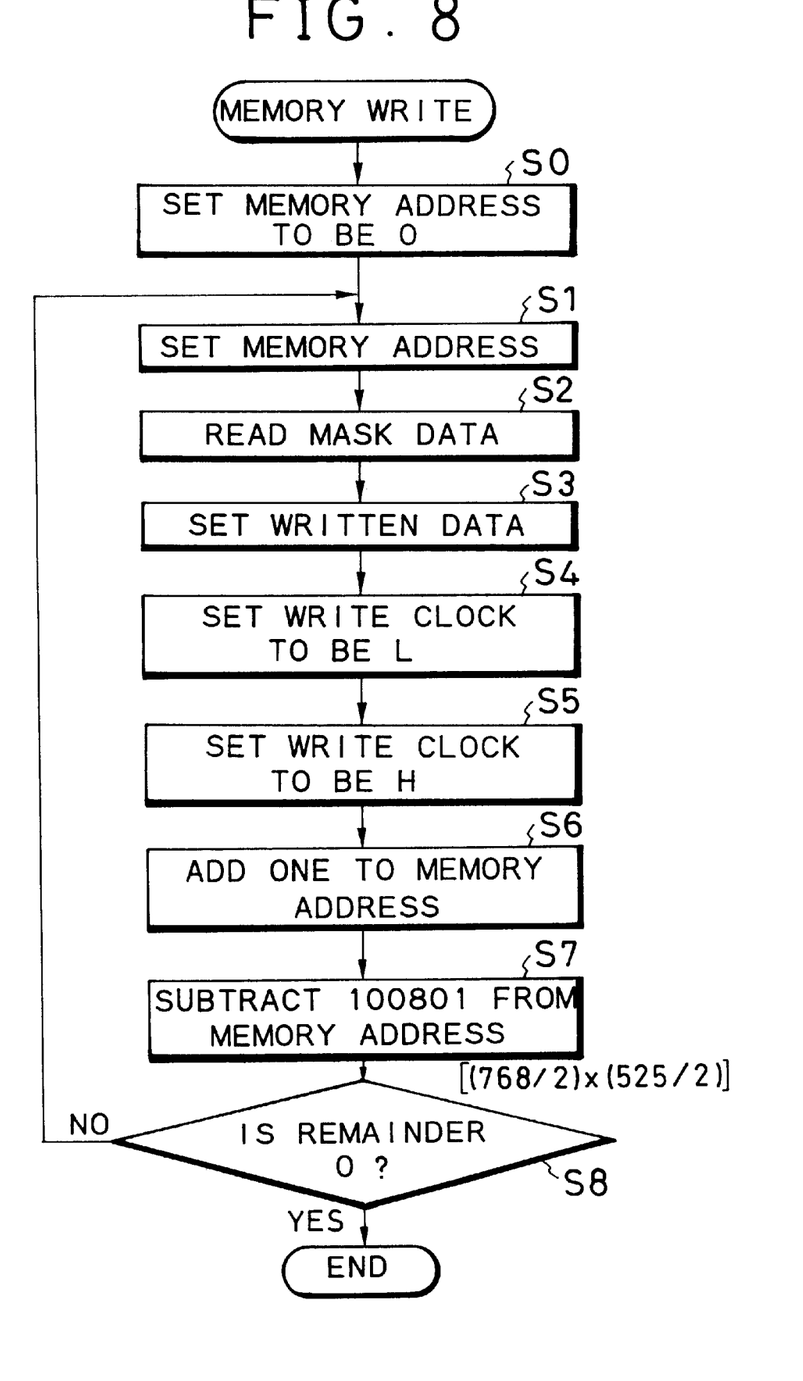
FIG. 8 is a flowchart showing an example of memory write operation at the time of electric mask generation.

Here, time for writing the quarter data $M_{1a}$ in the above-described mask generation memory 1 will be calculated. For example, it is assumed that horizontal pixels are 768 and vertical lines are 525 in the NTSC system, a clock frequency of a microcomputer is 10 MHz, and the microcomputer can process one instruction per clock. Then, according to a flowchart of memory write operation in FIG. 8, each necessary clock number (steps S0 to S8) will be multiplied. Time T to be necessary for write becomes $T=(1/10^7)\times(768/2)\times(525/2)\times8+(1/10^7)\approx0.08064$ [sec]. Since time for generating one screen is four times larger that the above-described time T, the time becomes $0.08064\times4=0.32256$ [sec]. In addition, in case of this NTSC system, display needs 1/30 sec per frame, and hence a frame number necessary in mask generation becomes $0.32256/(1/30)=9.6768$ [frames].

The write time T of the above-described data $M_{1a}$ is the time that becomes necessary in initial processing of image formation (at the time of power-on). Nevertheless, since quick image display cannot be performed because of necessity of about 9.7 frames in order to form one screen, it is expected to reduce the initial processing time including the write time of mask data.

Figures 11, 11A, 11B:
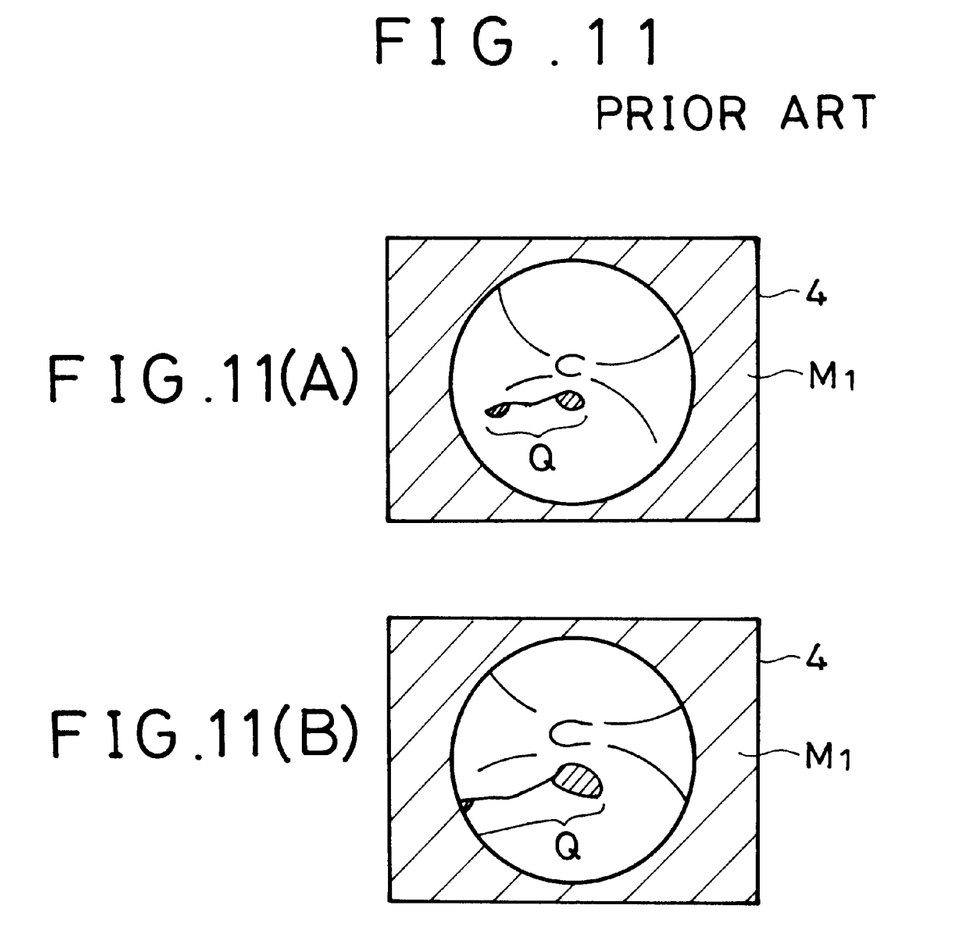
FIG. 11(A) is a schematic diagram showing a conventional standard screen before scaling operation.
FIG. 11(B) is a schematic diagram showing a screen at the time of performing conventional scaling operation.

In addition, conventional electric mask processing has a problem that, when an image is magnified, a necessary image may not be displayed by a mask. That is, a recent electronic endoscope has an optical zoom function for optically magnifying and imaging an object, and an electronic zoom function for electronically magnifying the image after image pickup. For example, as shown in the screen 4 shown in FIG. 11(A), if there is a concerned location Q in the image normally displayed, it occurs in the image that is magnified, displayed, and shown in FIG. 11(B) that apart of the concerned location Q is covered by the mask $M_1$.

Then, in the present application, it is proposed to magnify or reduce a mask according to an image magnified or reduced (scaling). Never the less, even in this case, there is a problem that the switching of magnification and reduction of the mask at the time of scaling operation is not performed smoothly.

The present invention has been achieved in consideration of the above-described problems, and its object is to provide an electric mask generating apparatus of an electronic endoscope that can shorten the time necessary for generation processing of a mask attached to a normal image or a magnified image, and can quickly display an object image to which the mask is attached.

SUMMARY OF THE INVENTION

In order to attain the above-described objects, an electric mask generating apparatus of an electronic endoscope according to the present invention generates an electric mask to cover a predetermined portion of a screen, and is characterized by including: a mask-generating circuit forming a mask signal expressing one pixel in one bit of information; mask generation memory storing the mask signal in one pixel per bit that is formed in this mask-generating circuit; and a mask-mixing circuit mixing the mask signal, which is read from this mask generation memory, with an image signal obtained with a solid-state image sensor.

According to this invention, on the basis of mask generation data stored in, for example, a control memory, a mask signal (image signal) having the configuration of one pixel per bit is generated by a microcomputer or the like, and this mask signal is once written in the mask generation memory. Therefore, writing time into this mask generation memory is shortened in one-eighth of the conventional writing time at which one pixel is written in one byte. After that, this mask signal having the configuration of one pixel per bit is mixed with the original image signal, which is formed with using a solid-state image sensor, by using a shift register or the like, and is outputted to a monitor or the like.

In addition, another invention is characterized by including: a scaling mask-generating circuit that performs mask scaling processing for an electric mask, covering a predetermined portion of a screen, according to image scaling of the electronic endoscopic apparatus having an image scaling function, and forms a mask signal in which one pixel is expressed in one bit of information; mask generation memory storing a scaling mask signal that has the configuration of one pixel per bit and is formed by this scaling mask-generating circuit; and a mask-mixing circuit mixing the scaling mask signal, which is read from this mask generation memory, with an image signal obtained with a solid-state image sensor.

According to this invention, when magnifying or reducing operation is performed by a scaling switch, a mask itself is also scaled. Thus, mask generation data according to a magnification rate is read by a microcomputer or the like, a mask signal (image signal), in which one pixel is expressed in one bit of information, is generated on the basis of this data, and this mask signal is once written in the mask generation memory. After that, by mixing this mask signal, having the configuration of one pixel per bit, with an original image signal, formed by using a solid-state image sensor, by using a shift register or the like, and outputting the signal, a new magnified image is displayed by the mask magnified (a mask whose opening section is enlarged) in a monitor. Since the writing time into memory in this case also is remarkably shortened and hence a mask is formed in short time, masks, which are switched at the time of scaling, are displayed smoothly.

In addition, it is possible to form an entire mask signal by storing a quarter or a half mask signal of the entire mask signal in the above-described mask generation memory, and reading the signal in this memory by changing a read direction.

Moreover, the above-described mask-generating circuit can be configured by first memory storing bit string generation data of an electric mask, which has the configuration of one pixel per one bit, with a program, and random access memory for developing the bit string generation data in this first memory.

DETAILED DESCRIPTION OF THE PREFERRED EMBODIMENTS

First Embodiment

Figure 1:
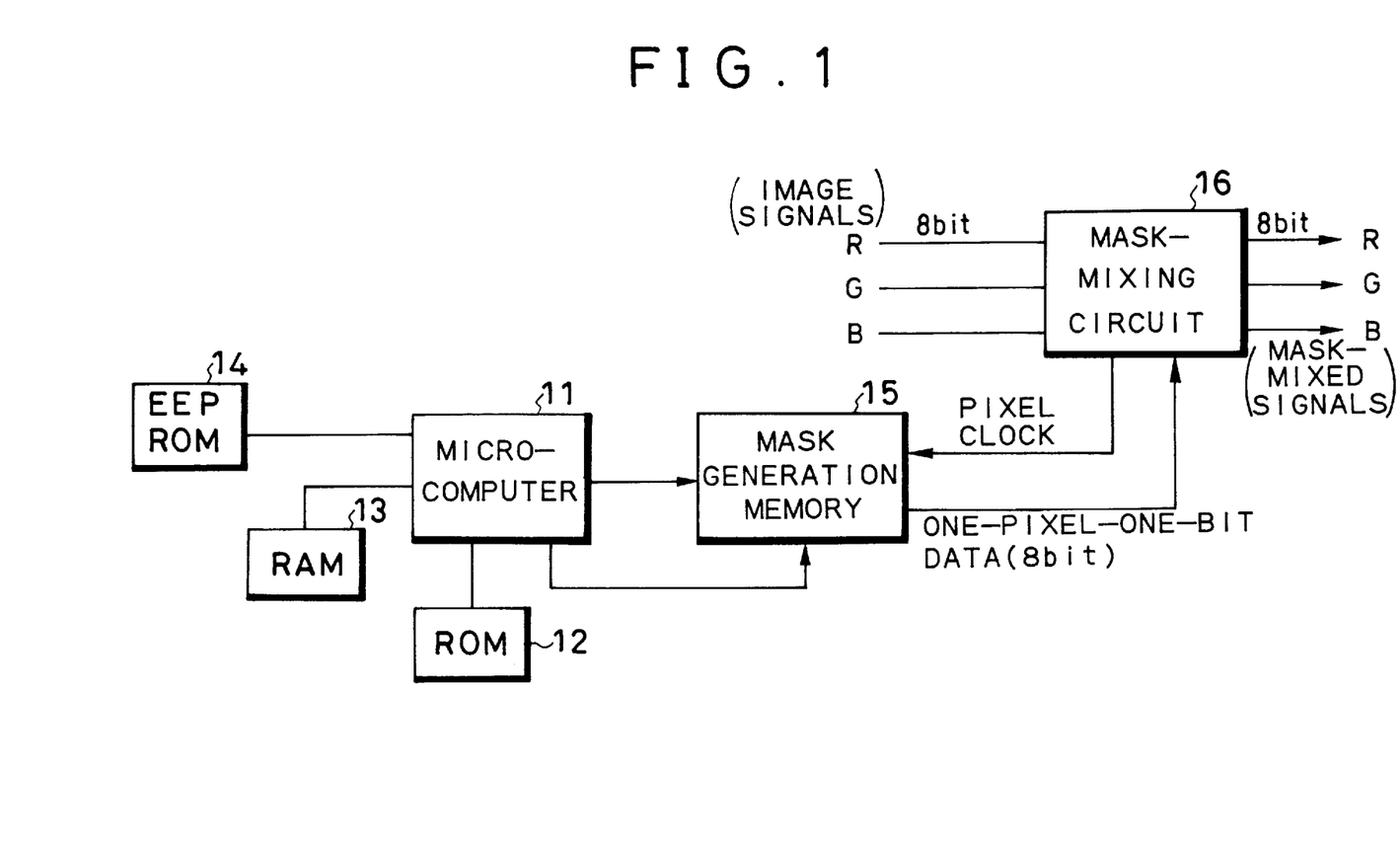
FIG. 1 is a block diagram showing a configuration of an electric mask generating apparatus of an electronic endoscope according to a first embodiment of the present invention.
Figure 2:
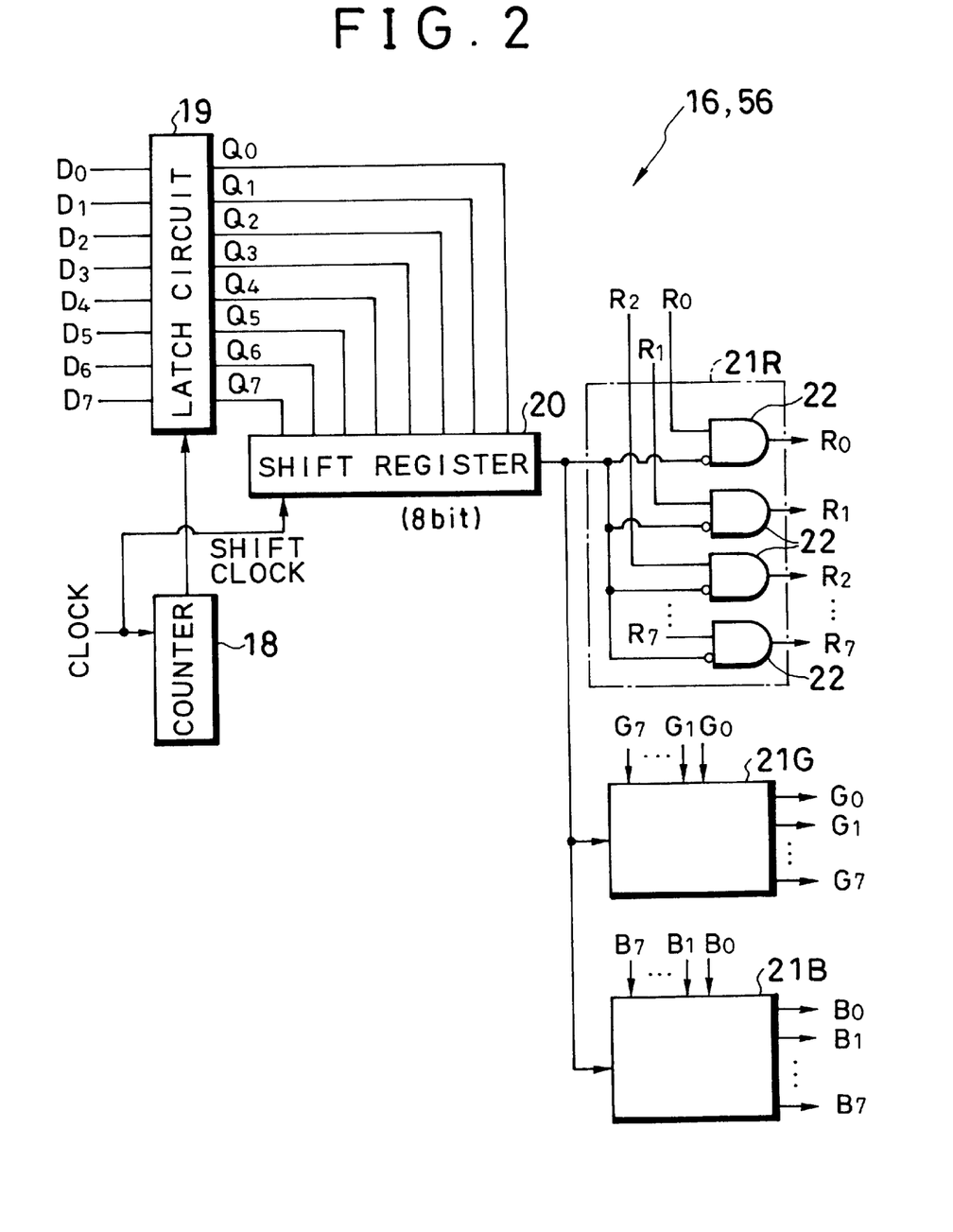
FIG. 2 is a schematic diagram showing a configuration of a mask-mixing circuit according to embodiments.

FIG. 1 shows a configuration of an electric mask generating apparatus of an electronic endoscope according to a first embodiment, and FIG. 2 shows a configuration of a mask-mixing circuit. This apparatus is built in, for example, a processing unit of an electronic endoscope, and a microcomputer 11 totally controlling this entire processing unit also functions as a mask-generating circuit. ROM (read only memory) 12 storing bit string generation data (program or the like) of the electric mask in which one pixel is expressed in one bit, RAM (random access memory) 13 for developing this mask bit-string data, and EEPROM 14 storing mask numbers for distinguishing kinds of masks are connected to this microcomputer 11. Thus, the above-described microcomputer 11 reads mask generation data, corresponding to a mask number read from the EEPROM 14, from the ROM 12, and develops a bit string, corresponding to pixels of a mask image, in the RAM 13.

Figure 3A:
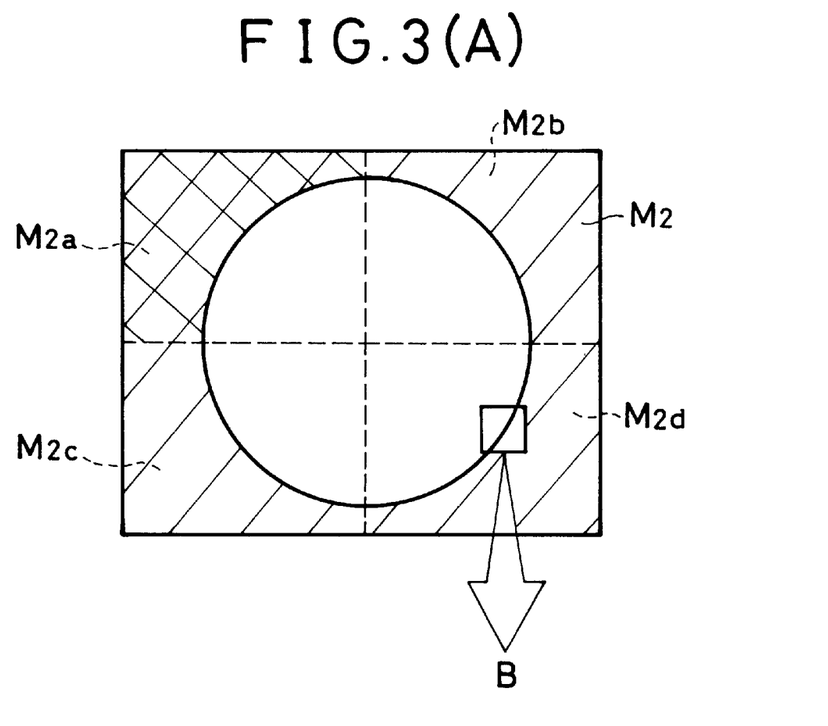
FIG. 3(A) is a schematic diagram showing a mask image in the first embodiment.

In addition, a mask generation memory 15 is connected to this microcomputer 11, and on the basis of data developed in the above-described RAM 13, a mask signal having the configuration of one pixel per bit is written in this mask generation memory 15. Although one mask image $M_2$ is shown in FIG. 3(A), for example, data $M_{2a}$ in an upper left portion which is a quarter image (a half image is also good) of the mask image $M_2$ is generated in the above-described mask generation memory 15. In addition, one piece of mask image $M_2$ shown in FIG. 3(A) is outputted by making the microcomputer 11 perform read control from this mask generation memory 15.

That is, by reading identical data $M_{2a}$ from the upper right side every horizontal line to a backward direction while sequentially reading the quarter mask data $M_{2a}$ with matching with each scan line from the upper left side, a top half portion of the mask image $M_2$ including a quarter data $M_{2b}$ in the upper right portion shown in FIG. 3(A) is formed. Next, a bottom half portion of the mask image $M_2$ is formed by obtaining a quarter data $M_{2d}$ in the lower right portion through reading identical data $M_{2a}$ from the lower right side every horizontal line in a backward direction at this time although a quarter data $M_{2c}$ is formed through reading data $M_{2a}$ from the lower-left side.

In addition, a mask-mixing circuit 16 to mix an output signal of the above-described mask generation memory 15 and an original pixel signal of an object image is provided. This pixel signal is obtained from a CCD located in an end part of an electronic endoscope, and this signal consists of, for example, three color signals, that is, R (red), G (green), and B (blue) signals.

FIG. 2 shows an internal configuration of the above-described mask-mixing circuit 16. This mask-mixing circuit 16 comprises a counter 18 to input a clock signal, a latch circuit 19 to latch bit data $D_0$ to $D_7$ of a mask signal, a shift register 20 to convert parallel signals $Q_0$ to $Q_7$, outputted from this latch circuit 19, into a serial signal on the basis of a shift clock, and signal-mixing sections 21R, 21G, and 21B to mix the mask signal with each of the R, G, and B signals. Since these signal-mixing sections 21R, 21G, and 21B have eight logic circuits 22, the mask signal is mixed with every pixel hereby.

Figure 3B:
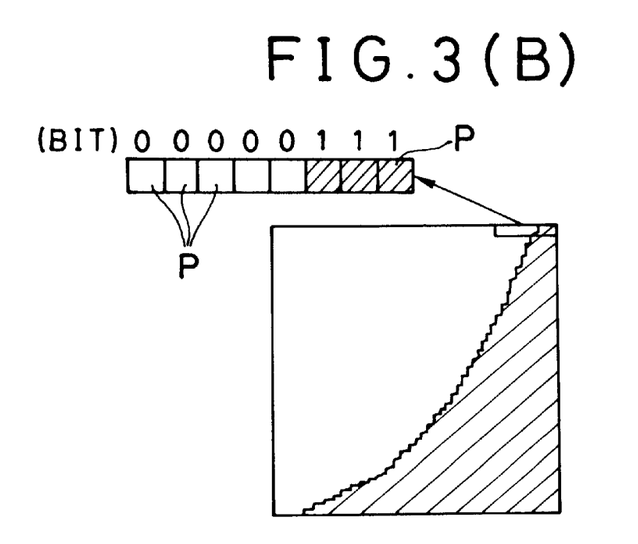
FIG. 3(B) is a schematic diagram showing an image that is obtained by magnifying a part of a mask shown in FIG. 3A.

The embodiment has the configuration described above, and its actions will be described next. The microcomputer 11 shown in FIG. 1 reads mask bit string generation data having the configuration of one pixel per bit that corresponds to a mask number set in the EEPROM 14 from the ROM 12 as described above, the bit string for forming a mask image is developed in the above-described RAM 13, and this bit string is sequentially written in the mask generation memory 15. In consequence, for example, a quarter mask data $M_{2a}$ shown in FIG. 3(A) is formed. In this mask data $M_{2a}$, one pixel is expressed in one bit as shown in FIG. 3(B) where a part of the mask image $M_2$ is magnified, and for example, a black pixel in a covered portion is set to be "1", and a through portion without pixel data is set to be "0".

In addition, although the mask data $M_{2a}$ in the above-described mask generation memory 15 is read four times by the above-described reading method, this mask data is supplied to the mask-mixing circuit 16 in parallel as data $D_0$ to $D_7$ every 8 bits as shown in FIG. 2. In this mask-mixing circuit 16, the above-described parallel bit data is converted into serial bit data through the latch circuit 19 and the shift register 20, and bit data of this mask signal is supplied to the signal-mixing sections 21R, 21G, and 21B.

Figure 10:
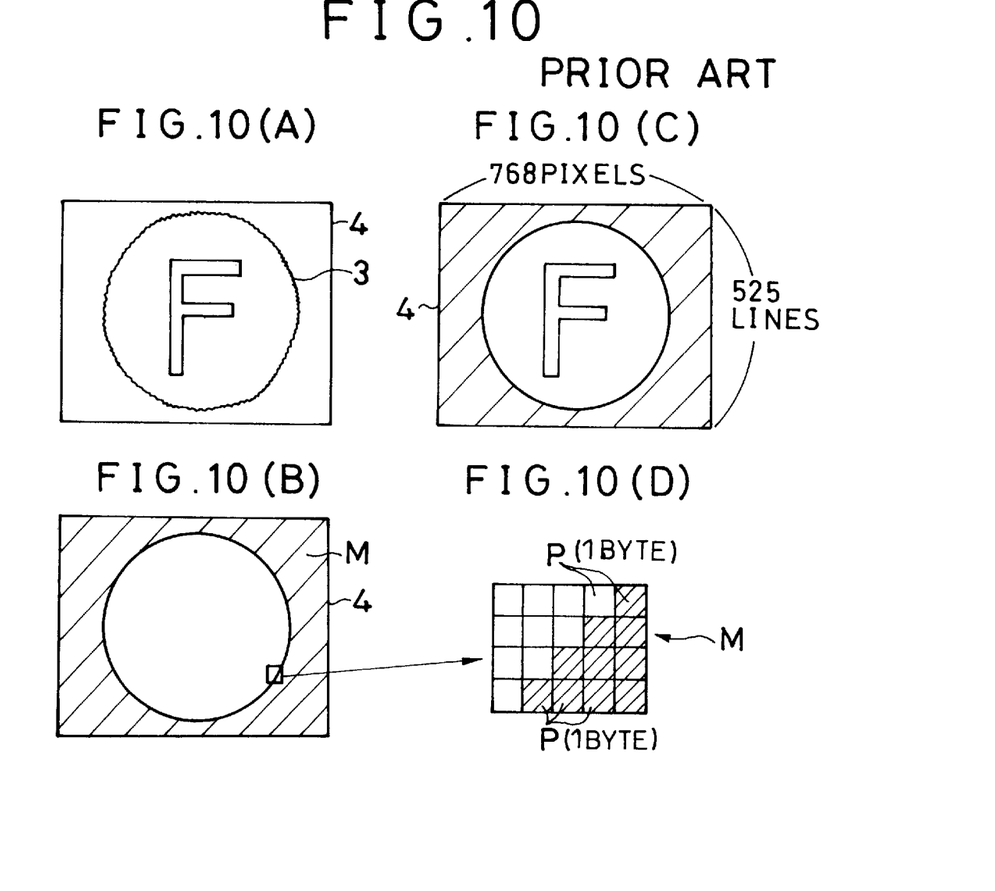
FIG. 10(A) is a schematic diagram showing an original image before masking in the circuit shown in FIG. 9.
FIG. 10(B) is a schematic diagram showing a mask image generated in the circuit shown in FIG. 9.
FIG. 10(C) is schematic diagram of the image masked in the circuit shown in FIG. 9.
FIG. 10(D) is a schematic diagram showing an image that is obtained by magnifying a part of the mask shown in FIG. 10(B)

For example, in the above-described signal-mixing section 21R, logical multiplication of red pixel signals $R_0$ to $R_7$ and an inverted signal of bit data of the above-described mask signal is operated by the logic circuits 22. Thus, because mask bit data "1" showing black, which is shown in FIG. 3(B), is inverted into "0", the logical multiplication results in "0" even if the red signals $R_0$ to $R_7$ each are any one of 1 or 0. Because data "0" showing a through portion is inverted into "1", the logical multiplication results in "1" if red signals $R_0$ to $R_7$ are "1". Green pixel signals Go to $G_7$, and blue pixel signals $B_0$ to $B_7$ are similar to this, and hence if all of R, G, and B signals become "0", a black pixel is formed, and if not, each color signal is outputted as a through signal. In this manner, an image signal to which the mask signal is given is formed, and an object image whose perimeter is covered with a mask as described in FIG. 10 is displayed in the monitor.

In such a first embodiment, because the mask data $M_{2a}$ written in the above-described mask generation memory 15 has the configuration of one pixel per bit, its data quantity becomes one-eighth of data quantity of conventional data configured in one pixel per byte. Thus, in case of one pixel per byte, the data quantity of the above-described quarter mask data $M_{2a}$ becomes $(^{768}/_2) \times (^{525}/_2) = 100800$ bytes, but in case of one pixel per bit, data quantity becomes one-eighth of its quantity, that is, $\{(^{768}/_2) \times (^{525}/_2)\}/8 = 12600$ bytes. Therefore, the number of frames written into the memory 15 is $9.6768/8 = 1.2096$, that is, about 1.2 frames, and hence it is possible to generate an electric mask in short time. In addition, an address for memory write becomes unnecessary if it is made that the address for memory write can be generated in the mask generation memory 15 automatically.

As described above, according to the first embodiment, because a predetermined mask signal in which one pixel is expressed in one bit is formed and this mask signal is written in the mask generation memory, it is possible to shorten the time required for electric mask generation at the time of power-on, and hence, an object image to which a mask is given can be displayed and observed quickly.

Second Embodiment

Figure 4:
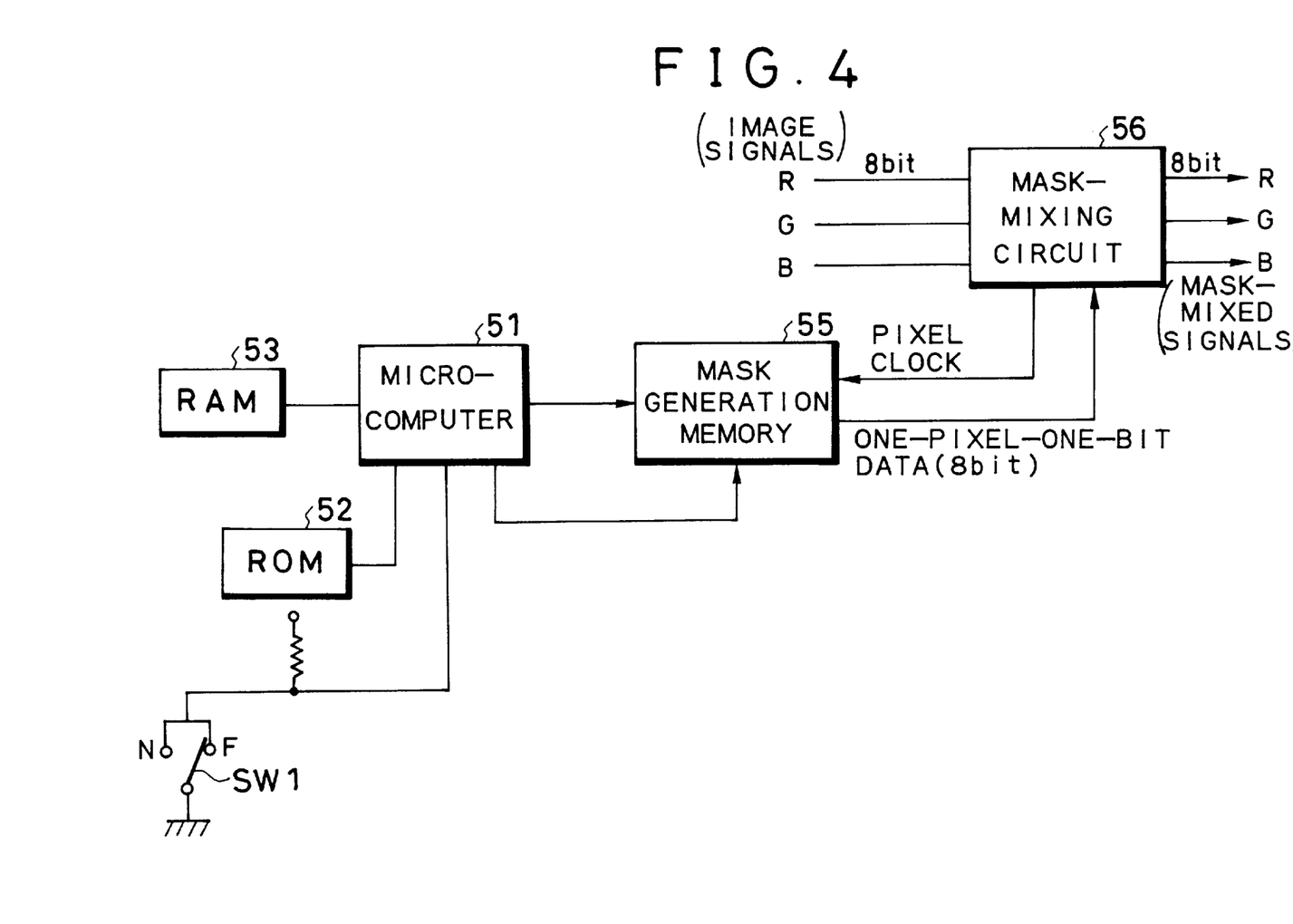
FIG. 4 is a block diagram showing a configuration of an electric mask generating apparatus of an electronic endoscope according to a second embodiment.

FIG. 4 shows a configuration of an electric mask generating apparatus of an electronic endoscope according to a second embodiment. This apparatus according to the second embodiment is built in a processing unit, too. ROM 52 storing bit string generation data (a program or the like) of the electric mask in which one pixel is expressed in one bit, and RAM 53 for developing this mask bit-string data are connected to a microcomputer 51 functioning as a mask generating circuit. Furthermore, a control signal for a scaling switch SW1 for performing operation in a magnifying direction (N) and a decreasing direction (F) is also inputted into the microcomputer 51.

That is, the above-described microcomputer 51 reads mask generation data corresponding to a scale factor set with the scaling switch SW1 from the ROM 52, and develops a bit string, corresponding to pixels of a mask image, in the RAM 53. In addition, the above-described scaling switch SW1 is a switch having an optical zoom function of optically magnifying an image by using a movable lens or the like, a switch having an electronic zoom function of magnifying an image, imaged with a CCD, by signal processing, or both switches.

In addition, mask generation memory 55 is connected to the above-described microcomputer 51, and a mask signal having the configuration of one pixel per bit is written in this mask generation memory 55 on the basis of data developed in the above-described RAM 13. The base of generation and read of this mask signal is similar to that in the first embodiment. Data $M_{2a}$ in the upper left portion which is a quarter of the mask image $M_2$ shown in FIG. 3(A) is generated in the above-described mask generation memory 55. By performing read control of the quarter data in this mask generation memory 55 in the above-described procedure, one piece of mask image $M_2$ shown in FIG. 3(A) is outputted.

In addition, there is provided a mask-mixing circuit 56 to mix an output signal of the above-described mask generation memory 55 and an original pixel signal of an object image obtained from a CCD. The internal configuration of this mask-mixing circuit 16 is shown in FIG. 2.

The second embodiment has the configuration described above, and next, actions of this embodiment will be described. First, at the time of power-up, a mask $M_2$ having standard dimensions that is shown in FIG. 5(A) is formed. The microcomputer 51 shown in FIG. 4 reads mask bit string generation data having the configuration of one pixel per bit from the ROM 52, the bit string for forming a standard mask image is developed in the above-described RAM 53, and this bit string is sequentially written in the mask generation memory 55. In consequence, for example, a quarter mask data $M_{2a}$ shown in FIG. 3(A) is formed. This mask data $M_{2a}$ is data where one pixel is expressed in one bit as shown in FIG. 3(B), and for example, a black pixel in a covered portion is set to be "1", and a through portion without any pixel data is set to be "0".

In addition, although the mask data $M_{2a}$ in the above-described mask generation memory 55 is read four times by a reading method similar to the method described in the first embodiment, this mask data is supplied to the mask-mixing circuit 56 in parallel as data Do to $D_7$ every 8 bits as shown in FIG. 2. In this mask-mixing circuit 56, this parallel bit data is converted into serial bit data, and bit data of this mask signal is supplied to the signal-mixing sections 21R, 21G, and 21B.

Figure 6A:
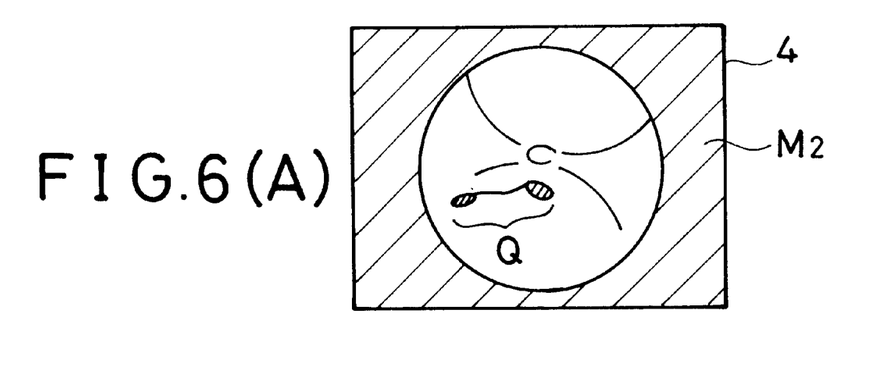
FIG. 6(A) is a schematic diagram showing a standard screen before scaling operation in the second embodiment.

In this signal-mixing section 21R, logical multiplication of red pixel signals $R_0$ to $R_7$ and an inverted signal of bit data of the above-described mask signal is operated by the logic circuits 22, and a black pixel is formed. In consequence, as shown in FIG. 6(A), the object image whose perimeter is covered by the standard mask $M_2$ is displayed on the monitor screen 4.

On the other hand, if zoom operation is performed by the scaling switch SW1 shown in FIG. 4, for example, the bit string generation data of a mask $M_3$ that has the configuration of one pixel per bit, is shown in FIG. 5(D), and corresponds to its magnification rate is read from the ROM 52 by the microcomputer 51. Then, a quarter mask data $M_{3a}$ of the bit string is written in the mask generation memory 55. In addition, the above-described magnified mask $M_3$ is generated, as shown in FIGS. 5(B), 5(C), and 5(D) in this sequence, by the control of reading data from this mask generation memory 55, and the mask $M_3$ is displayed by overwriting the mask $M_2$, which has been formed just before, from the upper part on the screen 4.

Figure 6B:
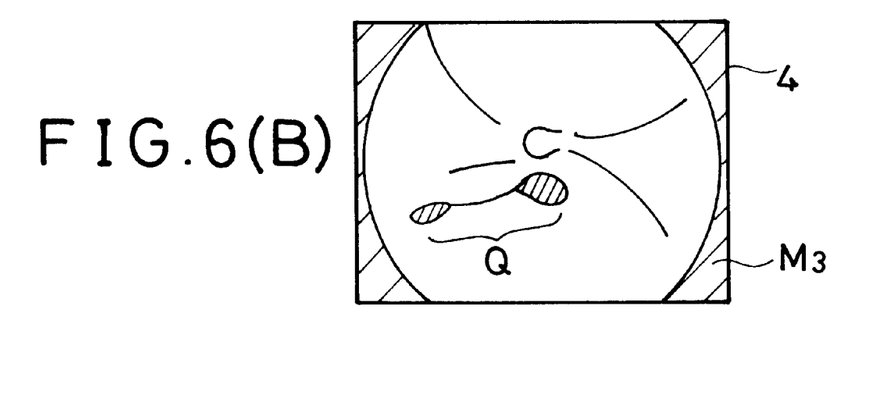
FIG. 6(B) is a schematic diagram showing a magnified screen at the time of performing scaling operation in the second embodiment.

In consequence, as shown in FIG. 6(B), a zoomed image can be displayed in the zoomed mask $M_3$, and a part of the concerned location Q is never covered by the mask $M_3$.

In addition, in this second embodiment also, because mask data $M_{2a}$, and $M_3$a that is written in the above-described mask generation memory 55 has the configuration of one pixel per bit, its data quantity becomes one-eighth of data quantity of conventional data configured in one pixel per byte. Hence, there is an advantage that, since an electric mask can be formed in short time, masks, which are switched at the time of scaling of magnification or reduction, are displayed smoothly. In addition, the time of this mask switch processing, that is, the time of forming masks that are shown in from the above-described FIG. 5(A) to FIG. 5(D) can be in black-out processing. In this case, mask generation process [FIG. 5 (B) and FIG. 5(C)] is not displayed on the screen 4.

What is claimed is:

1. An electric mask generating apparatus of an electronic endoscope that generates an electric mask covering a predetermined portion of a screen, comprising:

a mask-generating circuit forming a mask signal expressing one pixel in one bit of information;

mask generation memory storing the mask signal in one pixel per bit that is formed in this mask-generating circuit; and a mask-mixing circuit mixing the mask signal, which is read from this mask generation memory, with an image signal obtained with a solid-state image sensor.

2. The electric mask generating apparatus of an electronic endoscope according to claim 1, wherein an entire mask signal is formed by storing a mask signal from a quarter or a half mask area of an entire mask area in the mask generation memory, and reading the signal in this memory with changing a read direction.

3. The electric mask generating apparatus of an electronic endoscope according to claim 1, wherein the mask-generating circuit comprises first memory storing bit string generation data of an electric mask, which has configuration of one pixel per one bit, and random access memory for developing the bit string generation data in this first memory.

4. An electric mask generating apparatus of an electronic endoscope, comprising:

a scaling mask-generating circuit that performs mask scaling processing for an electric mask, covering a predetermined portion of a screen, according to image scaling of the electronic endoscopic apparatus having an image scaling function, and forms a mask signal in which one pixel is expressed in one bit of information;

mask generation memory storing a scaling mask signal that has configuration of one pixel per bit and is formed by this scaling mask-generating circuit; and a mask-mixing circuit mixing the scaling mask signal, which is read from this mask generation memory, with an image signal obtained with a solid-state image sensor.

5. The electric mask generating apparatus of an electronic endoscope according to claim 4, wherein an entire mask signal is formed by storing a mask signal from a quarter or a half mask area of an entire mask area in the mask generation memory, and reading the signal in this memory with changing a read direction.

6. The electric mask generating apparatus of an electronic endoscope according to claim 4, wherein the mask-generating circuit comprises a first memory storing bit string generation data of an electric mask, which has configuration of one pixel per one bit, and a random access memory for developing a mask bit string generation data in this first memory.

7. The electric mask generating apparatus of an electronic endoscope according to claim 4, wherein mask generation processing is not displayed by performing black-out processing in a period of mask switch processing when image scaling is performed.

* * * * *